(12) United States Patent
Harvill et al.

(10) Patent No.: US 6,922,252 B2
(45) Date of Patent: Jul. 26, 2005

(54) AUTOMATED POSITIONING METHOD FOR CONTOURING MEASUREMENTS USING A MOBILE RANGE MEASUREMENT SYSTEM

(75) Inventors: Thomas L. Harvill, Alamo, CA (US); Michel P. Bonin, San Ramon, CA (US); Soren T. Jensen, Oakland, CA (US)

(73) Assignee: Process Matrix, LLC, San Ramon, CA (US)

( * ) Notice: Subject to any disclaimer, the term of this patent is extended or adjusted under 35 U.S.C. 154(b) by 267 days.

(21) Appl. No.: 10/247,196

(22) Filed: Sep. 19, 2002

(65) Prior Publication Data

US 2004/0056217 A1 Mar. 25, 2004

(51) Int. Cl.[7] .............................................. G01B 11/06
(52) U.S. Cl. ...................................... 356/630; 356/614
(58) Field of Search ................................ 356/630, 625, 356/614, 602, 626, 601, 615–624, 606, 631

(56) References Cited

U.S. PATENT DOCUMENTS

| | | | |
|---|---|---|---|
| 4,893,933 A | * | 1/1990 | Neiheisel et al. ........... 356/608 |
| 4,895,440 A | | 1/1990 | Cain et al. |
| 5,137,354 A | | 8/1992 | deVos et al. |
| 5,212,738 A | * | 5/1993 | Chande et al. .............. 382/152 |
| 5,546,176 A | | 8/1996 | Jokinen |
| 5,570,185 A | | 10/1996 | Jokinen et al. |

* cited by examiner

*Primary Examiner*—Andrew H. Lee
(74) *Attorney, Agent, or Firm*—TraskBritt (57) ABSTRACT

The present invention relates generally to high-temperature vessels lined with refractory material. More specifically, the present invention relates to a method for implementation of tracking and contouring systems, automated collection of data, and processing of the measured data in either a stationary or a mobile configuration to accurately determine profiles of localized refractory thickness and/or bath height of molten material in the high-temperature vessel using the tracking system to fix the position of the contouring system with respect to the vessel.

20 Claims, 4 Drawing Sheets

AUTOMATED POSITIONING METHOD FOR CONTOURING MEASUREMENTS USING A MOBILE RANGE MEASUREMENT SYSTEM

BACKGROUND OF THE INVENTION

1. Field of the Invention

The present invention relates generally to high-temperature vessels lined with refractory material. More specifically, the present invention relates to a method for implementation of tracking and contouring systems, automated collection of data, and processing of the measured data in either a stationary or a mobile configuration to accurately determine profiles of localized refractory thickness and/or bath height of molten material in the high-temperature vessel using the tracking system to fix the position of the contouring system with respect to the vessel.

2. State of the Art

Metallic vessels or containers of various sizes and shapes designed to hold materials having a temperature at or above the melting point of the metal are widely used in many industrial applications, as, for example, gasification processes in chemical and power production and Electric-Arc Furnaces (EAF), Basic Oxygen Furnaces (BOF), ladles, blast furnaces, degassers, and AOD furnaces in steel manufacturing. These containers are normally lined with refractory material in order to protect the metallic part of the vessel from the high-temperature content placed therein, thus extending life, making the operation safe, and increasing industrial production. During use, normal wear and tear of the refractory material requires constant inspection thereof so as to assure extended use by performing early localized repair in order to avoid catastrophic failures and unnecessary or premature refurbishment of the entire vessel's refractory lining. Before the advance of laser-based inspection techniques, inspection of ceramic linings attempting to detect unacceptable levels of lining thickness was performed visually by an experienced operator looking for dark spots in the lining indicating either high localized heat transfer rates to the refractory material or possible excessive wear and the need for lining repair, such an approach being a combination of art and science, exposing the container operator to unnecessary industrial hazards, reducing the frequency of inspections, and lacking the desired accuracy.

Costs associated with the installation and repair of ceramic linings have increased significantly over the recent past as refractory materials have been carefully engineered for each application. To improve the efficient use of refractory materials, laser-based contouring devices have been developed to measure the refractory lining thickness in these high-temperature industrial vessels or containers. Typically, such laser-based systems measure range, which is the distance from the laser source to a multitude of points inside the target vessel. If the position of the ranging system is known relative to the target vessel, the measured range information can be initially converted to contour information, i.e., the outline of the curving or irregular shape of the refractory lining exposed to the high-temperature contents of the vessel and, subsequently, to absolute refractory lining thickness if the original thickness of the refractory lining material was known or to relative variations in refractory lining thickness by comparing a subsequent measurement to one made earlier in the same container. Refractory lining thickness measurements may be subsequently used to determine where repair materials might be applied to the lining wall and to assess the relative performance of various refractory compositions developed for specific applications and localized repairs.

A typical laser-based lining thickness measuring device will employ distance measurement electronics to measure the distance or range from the measuring device to the surface of the lining of the container. In order to measure the wear in the lining, i.e., the lining's thickness, this range information taken with respect to the coordinate system or frame of reference of the measuring device has to be converted or represented in the coordinate system or frame of reference of the container or vessel. Transforming the coordinate system of the measuring device to the coordinate system of the container is sometimes referred to as "fixing."

Depending on the application, the laser-based contouring or thickness measuring device can be mounted either permanently to a building structure near the container, e.g., a building column, or positioned on the floor next to the container whose refractory lining thickness is to be measured. Permanently mounting the measuring system is also known as a fixed-head installation. Measurements made in this configuration assume that the vessel is always going to be placed or remain in the same position or orientation relative to the instrumentation. The fixed-head approach offers the advantage of "always-on" measurement capability, simplified installation, and operation from a single, unchanging position relative to the vessel. Disadvantages of this approach include potentially limited coverage of the vessel interior and one-instrument-per-vessel installation requirements.

In U.S. Pat. No. 5,546,176 (hereinafter the '176 patent), issued on Aug. 13, 1996 and assigned to Spectra-Physics Visiontech OY, a fixing method is taught using three fixing points located at the bottom surface of the container and a laser transceiver mounted on top of a three-legged support at a fixed position away from the container. According to the method, the lining of the container is measured in such a way that, at first, a measuring device emitting and receiving optical radiation fixes the coordinate systems set for the measuring device and the container by mathematically combining the position of specific fixing points P1, P2, and P3 and angle data obtained during the measurement of the fixing points and after the rotation of the container. After the fixing, the lining on the inner surface of the container is then measured. In U.S. Pat. No. 5,570,185 (hereinafter the '185 patent), issued on Oct. 29, 1996 and also assigned to Spectra-Physics Visiontech OY, a similar method is disclosed teaching improvements for the fixing targets P1, P2, and P3 as well as placement of the laser transceiver on a carriage-like support and rails, which still maintains the distance between the transceiver and container fixed but adds the capability of moving the laser transceiver in a direction perpendicular to the line of sight of the measuring device.

Adding mobility to the measuring device is desirable because it provides multiplexing capabilities between multiple vessels and the ability to contour more of the furnace interior because the measurement position is not fixed. However, because the measurement position changes for each setup, a method is required to locate or fix the measuring device (both position and heading) relative to the vessel. Historically, this has been accomplished using fixed reference marks on the building structure surrounding the vessel or, more recently, using reference marks located on the bottom of the vessel as just explained with reference to the '185 and the '176 patents. It is known to those of ordinary skill in the art that both of these fixing approaches require operator input and, in the latter case, multiple set-ups of the target vessel, extending the total time of the contouring measurement, which in turn reduces process throughput and overall plant efficiency.

BRIEF SUMMARY OF THE INVENTION

The present invention relates generally to a method for implementation of tracking and contouring systems, automated collection of data, and processing of the measured data in either a stationary or a mobile configuration to accurately determine profiles of localized refractory thickness and/or bath height of molten material in the high-temperature vessel using the tracking system to fix the position of the contouring system with respect to the vessel.

BRIEF DESCRIPTION OF THE SEVERAL VIEWS OF THE DRAWINGS

The following drawings illustrate the present invention wherein.

DETAILED DESCRIPTION OF THE INVENTION

Figure 1:
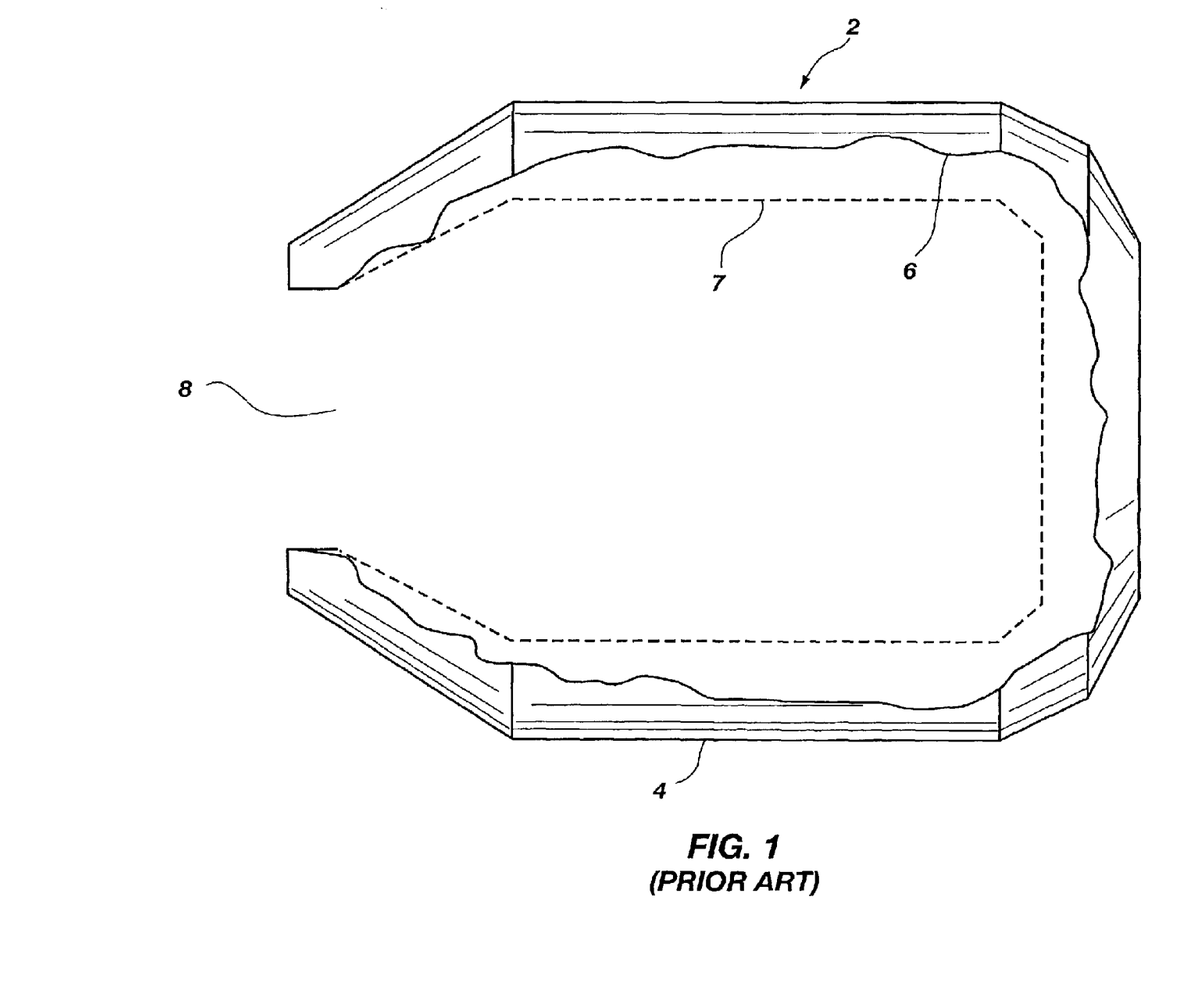
FIG. 1 illustrates a prior art container.

FIG. 1 shows a prior art container 2 having a metal shell 4, an internal layer of refractory material 6, and an opening 8. The dashed line in FIG. 1 illustrates the original layer of refractory material 7 before the container was placed in use. The present invention provides an automated process to measure the localized thickness, i.e., the localized distance between the internal layer of refractory material 6 and the container's metal shell 4, using a tracking system in order to eliminate the need to use fixing points at or near the high-temperature container. Either or both of the spatial location of the metal shell 4 or the original layer of refractory material 7 are known since they can be determined by traditional surveying methods or from blueprint information. It is understood that the method disclosed herein will not only be useful to measure profiles of localized refractory thickness in high-temperature containers or vessels, but it will be applicable as well to measure the height of molten materials placed therein.

Figure 2:
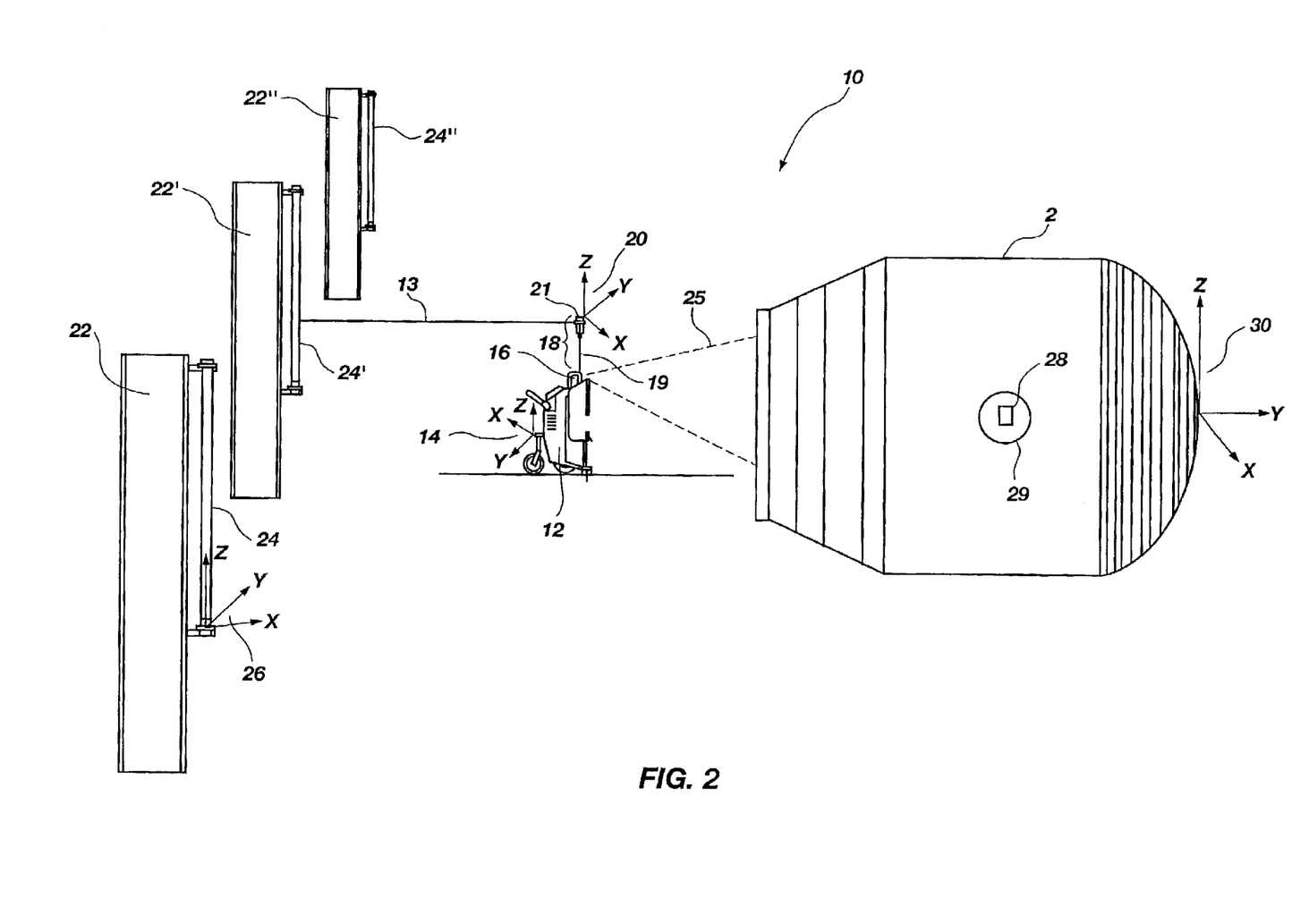
FIG. 2 illustrates a mobile cart device with tracking and contouring systems measuring the refractory thickness of an industrial container using three permanently mounted reflectors as reference points for the tracking system.

FIG. 2 shows a refractory lining thickness measurement setup 10 comprising a mobile cart 12 with at least a tracking system 18 and a contouring system 16 mounted thereon, a container 2, and at least three reflectors 24, 24', and " installed on building structures 22, 22', and 22" near the location of container 2 in the working environment. However, it should be noted that the method of the present invention is not limited to the use of a mobile cart 12. Different configurations of the invention are possible that will take into account space availability and particular requirements of a given application. For example, in order to avoid problems with hot metal and scrap charging, tap side measurement locations may also be employed. Arrangements of the present invention anchored to the tap floor, building columns, or in the hood area are all possible for placing the sensor as close to the vessel mouth as possible to maximize the field of view thereto.

In one embodiment of the method of the present invention, four steps are required. First, placement of sensors on the container 2 to determine its position and orientation. Second, implementation of a remote transmitter and receiver pair to transmit to the contouring system 16 the position and orientation of container 2. Third, implementation of the position tracking system 18 and inclinometers in the contouring system 16 to determine the position and the orientation thereof. And, fourth, implementation of a mathematical algorithm to transform the tracking and contouring system's measurements into a contour of local thickness of the refractory material in the container, correcting the transformation to possible variations, such as, for example, angular distortions in the tracking system measurements, for higher accuracy. If the location and orientation of the container and measurement system are fixed and known, the solution is straightforward. If, however, either element has variable degrees of freedom, each degree of freedom must be measured by means available in the prior art to allow accurate conversion and representation of the data. In addition, if the measurement system is mobile and the terrain over which it moves is irregular, an exact determination of the position of the measurement system relative to the container is required. Placement of sensors is highly dependent on the nature of the application and the degrees of freedom in the installation of the container. For example, a typical application of the contouring system would be contouring of a BOF where the only unknown degree of freedom is the tilt of the furnace.

FIG. 2 shows an example of an application of the method of the present invention for measuring the thickness or contour of the refractory material in a BOF. For this application, only a precision inclinometer 28 to measure tilt is installed on the drive axis 29 of the BOF. In one of the embodiments of the present invention, a radio link that automatically broadcasts the furnace tilt measured by the precision inclinometer 28 to a receiver (not shown in FIG. 2) located in the mobile cart 12 is used, incorporating a spread-spectrum transceiver for interference-free signal transmission having an operating frequency of the order of gigahertz. During the measurement, the radio receiver automatically reports the furnace tilt to the controlling computer. Together, the laser tracking system and radio link enable fast and error-free measurements of a basic oxygen furnace's refractory thickness. Single measurements can be made in 20 to 30 seconds. An entire map of the furnace interior consisting of 4 to 6 measurements and more than 500,000 data points can be completed in less than 10 minutes. Nonetheless, the method of the present invention is equally applicable to other furnaces with two or more degrees of freedom, as, for example, a ladle, wherein translation and rotation in three dimensions are possible.

In operation, the tracking system 18 measures the location of the mobile cart 12 in the working environment with respect to its coordinate system or frame of reference 20 using the reflectors 24, 24', and 24". The contouring system 16 measures the range or distance from several points in the internal layer of refractory material 6 (FIG. 1) to the mobile cart 12 with respect to the cart's own frame of reference 14. By knowing the original shape of the refractory material 7 and/or the spatial position of the container's shell 4 with respect to the container's coordinate system or frame of reference 30 and using a stationary frame of reference 26, preferably set at one of the reflectors, the thickness of the refractory lining with respect to the container's frame of reference 30 can be calculated at each point where range measurements were made by a mathematical transformation of the range measurements from the contouring system's frame of reference 14 to the container's frame of reference 30. Such transformation takes into account the relative position of the tracking system with respect to the contouring system and the container's frame of reference 30, the tracking system's frame of reference 20, the contouring system's frame of reference 14, the location of reflectors 24, 24', 24", and the stationary frame of reference 26. One of the objectives of the present invention is to provide an automated method to measure the localized thickness of the refractory material 6.

Figure 3:
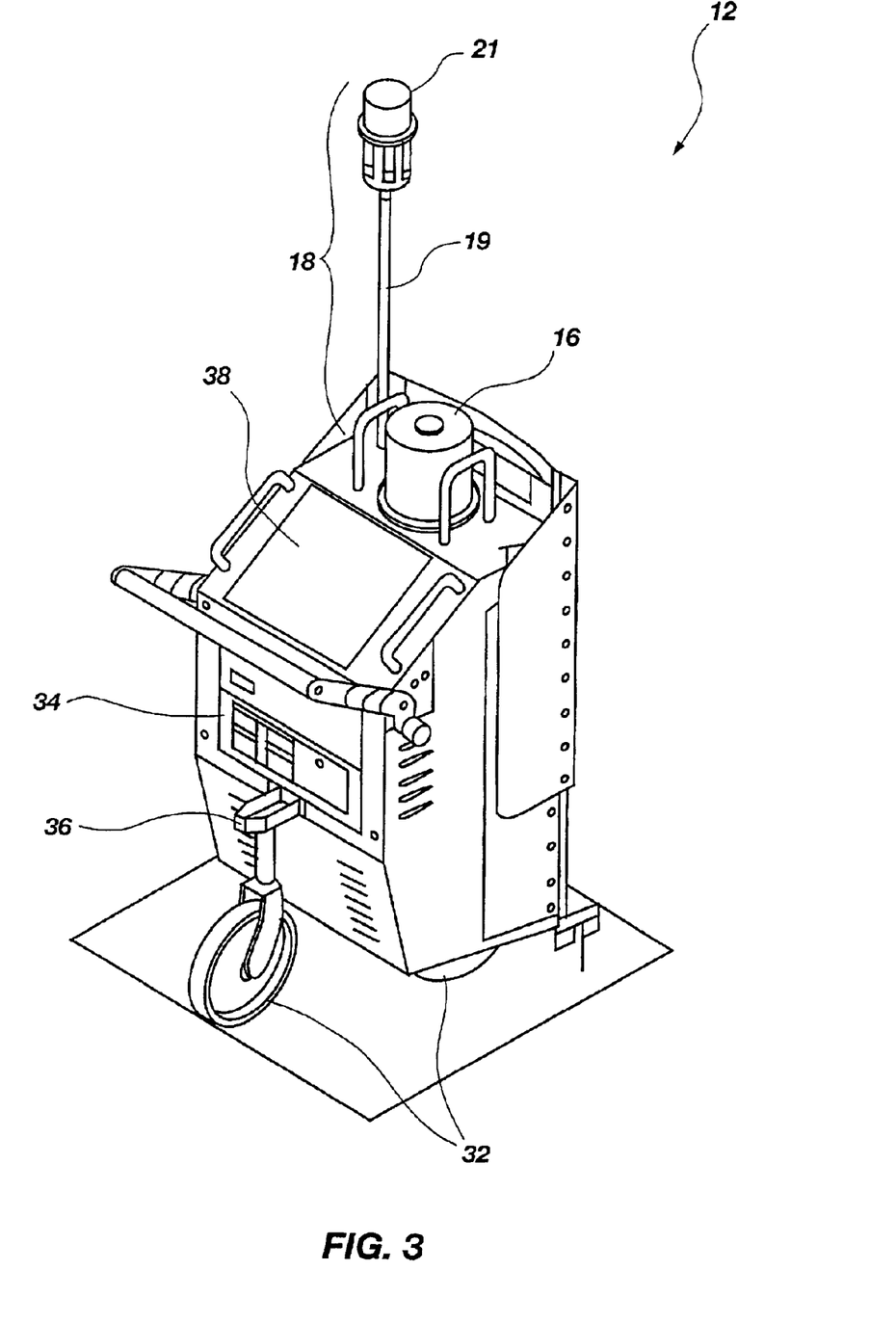
FIG. 3 illustrates an expanded view of the mobile cart device.

The mobile cart 12 is further illustrated in FIG. 3. In one embodiment of the invention, the cart is approximately 0.76 m wide, 0.61 m deep, and 1.65 m tall and contains the main components, i.e., laser-based contouring head, tracking system, computer hardware and software, and cabling. The laser-based tracking system 18 consists of a rotating beacon 21 placed on top of the pole 19 as illustrated. The cart is a self-contained unit, having therein a liquid-crystal flat panel 38, keyboard and mouse function (not shown in FIG. 3), a computer and associated hardware 34 protected against dust and vibration, large-diameter wheels 32 to reduce rolling resistance, and several other components not illustrated in FIG. 3, including a foldout heat shield to protect the hardware and to provide comfortable operation when used by an operator, a high-speed Ethernet link, and on-board battery power. The Ethernet link enables fast, long distance transmission between the computer and optical or contouring head. For many applications, remote operation is possible by placing the computer in a location separate from the cart location, for example, a control room in the plant where the high-temperature vessel is located, or other suitable structure away from the vessel. Furthermore, the mobile cart 12 requires no external cables or cooling lines and is fully suspended on the wheels 32 in order to reduce shock and vibration to cart components. The mobile cart system must either be self-leveling or have integrated inclination measurements to determine tilt. Inclinometers may be preferred because they eliminate the need for a complex mechanical system and can be rapidly read by the contouring system. Typically, the Z coordinate of the mobile contouring system is assumed constant and known; nevertheless, the scope of the method of the present invention does include solutions wherein such an assumption is not present.

While the tracking system is in operation, the rotating beacon 21 emits a beam of optical radiation 13 that is reflected off the at least three reference reflectors 24, 24', and 24" (FIG. 2). The pole 19 is retractable to allow easy transportation of the system when retracted and allows line-of-sight visibility to the reference reflectors when extended. The rotating beacon 21 is also configured to sense the optical radiation reflected from each of the reflectors and to measure and record the angle at which each individual reflection takes place. The position of the reflectors is known relative to the container's frame of reference 30 and may be determined by common surveying methods or from the blueprints of the container and floor plan of the industrial site. Using triangulation, the recorded angles are used to calculate the position and heading of the beacon. Once the position and orientation of the beacon are determined, a mathematical transformation can be performed on the position and orientation information to determine the exact location and heading of the contouring system. It is understood that such capability will eliminate the need to use fixing points mounted at or near the high-temperature container and will also eliminate the need for user interference while measurements are being made. In the solution procedure for the tracking system, one may solve for the position of the tracking system in a given frame of reference from knowledge of the vector position of each reflector in the same frame of reference. Contrarily, one may also solve the vector position of each reflector based on knowledge or measurements of the position of the tracking system.

Suitable tracking systems are offered by a number of vendors, including MTI Research and Guidance Control Systems. Also, several embodiments of the tracking system are taught and disclosed by U.S. Pat. No. 4,895,440 (issued on Jan. 23, 1990 and assigned to Spectra-Physics, Inc.) and U.S. Pat. No. 5,137,354 (issued on Aug. 1, 1992 and also assigned to Spectra-Physics, Inc.), the contents of which are herein incorporated by reference. In the method of the present invention, the operation of the laser tracking system 18 is automated and, in one of the embodiments, it is automatically updated ten times per second. In some applications of the present invention, such as, for example, a converter furnace, the automated features of the method coupled with the high-speed data acquisition capabilities provide several advantages not found in prior-art solutions, i.e., push-button measurement capability, heat-to-heat assessment of refractory wear, detection of sudden variations in wear patterns (with direct relation to changes in process, prediction, and scheduling of maintenance in advance of the immediate need for repairs), and heat-to-heat lance height control.

Several contouring systems are known and commercially available in the art. The primary component of a contouring system 16 is a sensor that measures range, i.e., the distance from the contouring system to a target, and location of that target with respect to the range sensor. In operation, optical radiation 25 (FIG. 2) from an optical radiation source in the contouring system 16 is emitted to the inside of the container and the reflected optical radiation from the inside of the container is detected back by the contouring system. Based on the time taken between the emitted and reflected radiation to leave and reach the contouring system, respectively, and the characteristics of the radiation source, the distance between the contouring system and the surface of the container that cause the radiation reflection can be measured. Typical range measurement systems use a scanned beam to quickly record multiple positions and ranges. When the range data are acquired, they are referenced to the position of the range measurement device, i.e., the frame of reference 14. The desired contouring or thickness information, e.g., the shape of the internal layer of refractory material 6 shown in FIG. 1, however, is relative to the container 2 or the known original layer of refractory material 7 (hereinafter referred to as the "reference shape"). Therefore, the range data measured in the frame of reference 14 needs to be converted into a frame of reference 30 relative to the reference shape, taking into account the position of the mobile cart 12 measured with the tracking system 18 with reference to its own coordinate system or frame of reference 20. The converted data can then be presented in a meaningful fashion to the user, or incorporated directly into the contouring measurement as needed for the conversion of range data to contour and/or thickness information.

A first embodiment of a suitable contouring system is manufactured by Riegl Laser Measurement Systems. The Riegl scanning range finder captures full image profiles at up to 28,000 points per second with an accuracy of ±2 inches over a field of view of 80° by 330°. It consists of a three-sided scanning mirror and a pulsed laser range finder integrated in a single, stand-alone package. The mirror deflects the laser in one axis, and the mirror and range finder are rotated together in the second axis to capture the full field of view. The Riegl instrument's integral cooling requires 2 to 3 m standoff from high-temperature (2200° F.) surfaces, precluding refractory thickness measurements in high-temperature environments that have limited optical access such as a gasifier. A second embodiment of a suitable contouring system is manufactured by Cyra, also known as the Cyrax model. The Cyrax system is an accurate, full image capture system based on pulse range finding. As with the Riegl instrument, the Cyrax scanner is also integrated with the range finder. Contouring measurements from high-temperature surfaces are not supported without additional cooling hardware to protect the scanner. The Cyrax system takes many pulse measurements per point to obtain accurate images at long range. Each image takes as much as several tens of seconds to acquire. The slow speed and high cost make it uncommon in general process applications. A third embodiment of a suitable contouring system is manufactured by Perceptron. The Perceptron contouring system is also an integrated, full image capture scanning system based on CW range finding for general industrial applications and a specialized timber profiling system composed of three scanners. Data acquisition rate of the Perceptron contouring system is 100,000 points per second, and the accuracy may vary between 0.1 and 0.5 inches. This large system is not suited to portable applications where the scanner must be moved rapidly into and out of a harsh environment. Yet a fourth embodiment of a suitable contouring system is manufactured by Acuity Research. The Acuity system is a single-axis line scanning system. Like the Riegl scanner, it is a general-purpose component for shape capture. The Acuity model may also have a pan head on which the sensor line scanner can be mounted for full image capture. Acuity systems are used in applications such as crime scene capture and calculation of the volume of materials on conveyors and open-bed trucks. The range finder is accurate to 0.1 inch, with a maximum data rate of 50,000 points per second.

In order to provide reliable or calibrated thickness or contour information measured by the contouring system, a mathematical combination or transformation of those measurements must take into account the position of the contouring system with respect to a stationary frame of reference or coordinate system. In the present invention, the position of the contouring system is determined by the tracking system, whose position with respect to the contouring system is also taken into account in this transformation.

Mathematically, the transformation or combination is based on the fact that, given a first coordinate system or frame of reference, a second coordinate system, whose positioning vector $(T_{2,1})$ is known in the first coordinate system, and a point A, whose positioning vector $(V_{A,1})$ is also known in the first frame of reference, the positioning vector of point A $(V_{A,2})$ in the second frame of reference can be determined by multiplying the vector difference between $V_{A,1}$ and $T_{2,1}$ by a transformation matrix $(M_{1:2})$ that converts coordinates from the first frame of reference to the second, that is:

$$V_{A,2}=M_{1:2}(V_{A,3}-T_{2,3}). \quad (1)$$

In the subscript notation used above and hereinafter, the element after the comma denotes the frame of reference for the vector. The coefficients of $M_{1:2}$ are calculated using the rotation angles with respect to X, Y, and Z axes of the second coordinate system about the first or primary coordinate system, carefully considering the rotation order. If the positioning vector of point A in the second frame of reference $(V_{A,2})$ is known instead, the positioning vector of point A in the first frame of reference $(V_{A,1})$ can be calculated by multiplying the transpose of the matrix of $M_{1:2}(M_{1:2}^T)$ by $V_{A,2}$ and vectorially adding that result to $T_{2,1}$. That is:

$$V_{A,1}=M_{1:2}^T V_{A,2}+T_{2,1}. \quad (2)$$

As applied to the present invention, extension of the above-explained transformation of coordinates can be used to calculate the thickness of the internal layer of refractory material 6 or the position of the container's shell 4 with respect to the container's coordinate system 30 at each point where range measurements are made. This is accomplished by a mathematical transformation or combination of the range measurements from the contouring system's coordinate system 14 to the container's frame of reference 30 if one knows the original shape of the refractory material 7 or the position of the container's shell 4 with respect to the container's frame of reference 30. This mathematical transformation or combination takes into account the relative position of the tracking system 18 with respect to the contouring system 16, the container's frame of reference 30, the tracking system's frame of reference 20, the mobile cart's frame of reference 14, and the stationary frame of reference 26. For example, considering a point R in the surface of the internal layer of refractory material 6, calculation of the contour of the surface of the refractory material 6 in the container's frame of reference 30 $(V_{R,30})$ is determined by first calculating the positioning vector of point R in the cart's frame of reference 14 $(V_{R,14})$. This first step is accomplished by multiplying the difference between the positioning vector of point R in the tracking system's frame of reference 20 $(V_{R,20})$ and the positioning vector of the cart's frame of reference 14 in the coordinates of the tracking system's frame of reference 20 $(T_{14,20})$ by the transformation matrix $(M_{14:20})$ that converts coordinates from the cart's frame of reference 14 to the tracking system's frame of reference 20, that is:

$$V_{R,14}=M_{14:20}(V_{R,20}-T_{14,20}). \quad (3)$$

Second, the positioning vector of the cart's frame of reference 14 in the coordinates of the stationary frame of reference 26 $(T_{14,26})$ is determined by multiplying the transpose of the matrix that converts coordinates from the stationary frame of reference 26 to the tracking system's frame of reference $(M_{26:20}^T)$ by the positioning vector of the cart's frame of reference 14 in the coordinates of the tracking system's frame of reference 20 $(T_{14,20})$ and adding that result to the positioning vector of the tracking system's frame of reference 20 in the coordinates of the stationary frame of reference 26 $(T_{20,26})$, that is:

$$T_{14,26}=M_{26:20}^T T_{14,20}+T_{20,26}. \quad (4)$$

Third, the positioning vector of point R in the stationary frame of reference 26 $(V_{R,26})$ is determined by multiplying the transpose of the matrix that converts coordinates from the stationary frame of reference 26 to the cart's frame of reference 14 $(M_{26:14}^T)$ by the positioning vector of point R in the coordinates of the cart's frame of reference 14 $(V_{R,14})$ and adding that result to the positioning vector of the cart's frame of reference 14 in the coordinates of the stationary frame of reference 26 $(T_{14,26})$, that is:

$$V_{R,26}=M_{26:14}^T V_{R,14}+T_{14,26}. \quad (5)$$

Finally, calculation of the positioning vector of point R in the container's frame of reference 30 $(V_{R,30})$ is performed by multiplying the difference between the positioning vector of point R in the stationary coordinate system 26 $(V_{R,26})$ and the positioning vector of the container's frame of reference 30 in the coordinates of the stationary frame of reference 26 ($T_{R,26}$) by the transformation matrix ($M_{26:30}$) that converts coordinates from the stationary frame of reference 26 to the container's frame of reference 30, that is:

$$V_{R,30} = M_{26:30}(V_{R,26} + T_{R,26}). \tag{5}$$

The above-described calculations assume that there are no distortions in the cart position measurements made by the tracking system 18. Even if one assumes that the Z position of the tracking system's beacon is fixed, distortions may still occur because the beacon 21 can be rotated about either its X or Y axis due to the unevenness of the floor where the mobile cart 12 is positioned or foreign objects found thereon. In one of the preferred embodiments, the method of the present invention provides for corrections of these distortions in the angle measurements made by the tracking system 18 by use of an iterative algorithm when the mobile cart 12 is instrumented such that angular variations with respect to the X and Y axis in the frame of reference 14 are measured by means well known to those of ordinary skill in the art. Assuming that the reflectors are infinitely long lines parallel to the Z axis of the stationary frame of reference, corrections in angular distortions in the tracking system can be implemented by another coordinate transformation to solve iteratively a system of equations to determine the true or corrected solution for $T_{14,26}$ as illustrated by the flowchart in FIG. 4, wherein the N vectors are the coordinates of the tracking system's reflectors with respect to the stationary frame of reference 26. In the first step of the iterative process in FIG. 4, the coefficients of the transformation matrix $M_{26:20}$ are calculated from the rotation angles of the tracking system's frame of reference 20, using an initial tracking system solution and observing the order dependency of the matrix. In the next step, the vertical coordinate of the tracking system's reflectors with respect to the stationary frame of reference 26 are calculated. Subsequently, in the third step, the positioning vector of each reflector in the stationary frame of reference 26 is determined by use of a transformation of coordinates similar to the ones previously explained followed by the calculation of the distance from the tracking system to the reflectors (fourth step) and the calculation of new values for the positioning vector components in the X and Y directions and the rotation angles of the tracking system's frame of reference 20 are performed in the fifth step. If the changes between the new and old values for the positioning vector coordinates are less than a pre-specified tolerance value, the iterative process stops; otherwise, a new iteration takes place.

Figure 4:
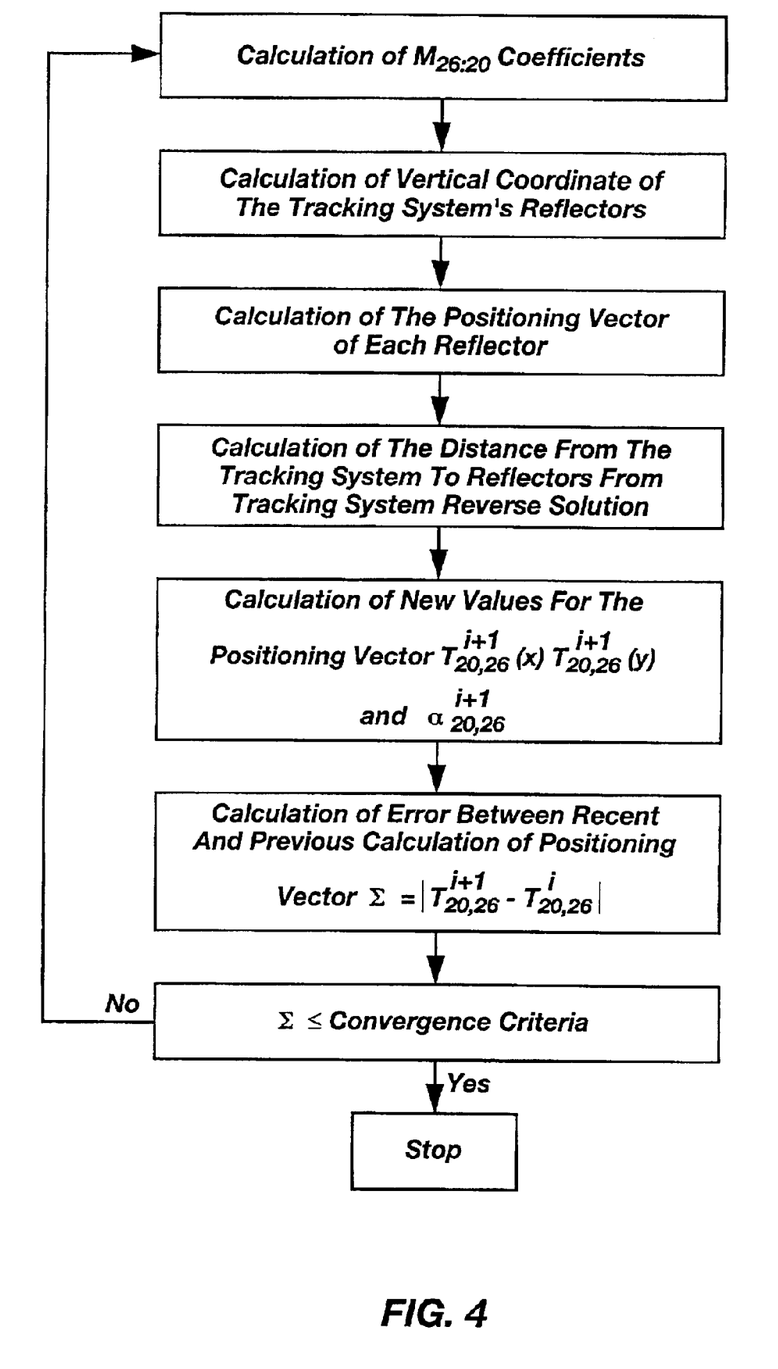
FIG. 4 illustrates a flowchart showing the steps in correcting the tracking system solution for angular distortions about the X and Y axes of the tracking system's coordinate system.

The iterative process illustrated in FIG. 4 assumes a substantially collimated illumination beam, such as that manufactured by Guidance Control Systems. In a different embodiment offered by MTI Research, the laser is expanded in one dimension to form a beam fan with the fan parallel to the Z axis and the strip reflectors 24, 24', and 24" illustrated in FIG. 2 are replaced with either round reflectors or active reflectors that sense the input beam and send a return pulse. This configuration simplifies the solution process slightly by eliminating the second step of the iterative process in FIG. 4 since the vertical or Z positions of the reflectors are known.

Although typical embodiments and details have been explained hereinabove with the intention of illustrating several best modes of the present invention as applied to measuring refractory thickness in high-temperature containers or the level of metal material placed therein, it is understood that several changes and variations in the methods, apparatuses, and systems disclosed herein may be implemented within the scope of the present invention, the scope of the invention being appropriately determined by the claims appended below.

What is claimed is:

1. A method for measuring the thickness of lining material inside a container comprising:
    providing a container having an opening and a known coordinate system with respect to a working environment thereof,
    selecting an inertial frame of reference in said working environment,
    providing at least three reflectors mounted to stationary structures in said working environment, wherein the position of each one of said at least three reflectors with respect to said inertial frame of reference is known,
    providing a tracking system,
    providing a contouring system, wherein the position of said contouring system with respect to said tracking system is known,
    determining a position of said tracking system with respect to said inertial frame of reference by emitting optical radiation from a first optical radiation source in said tracking system to said at least three reflectors and receiving reflected optical radiation from said at least three reflectors to said tracking system,
    making a plurality of range measurements with said contouring system to a plurality of points located at the surface of said lining inside said container by emitting optical radiation from a second optical radiation source in said contouring system to the inside of said container and receiving reflected optical radiation from the inside of said container to said contouring system, and
    mathematically combining said plurality of range measurements with at least one of said inertial frame of reference, said known coordinate system, said position of said tracking system, said position of each one of said at least three reflectors, and said position of said contouring system with respect to said tracking system in order to determine said thickness of lining material in said container,
    providing a mobile cart having at least said tracking system and said contouring system mounted thereon,
    changing a position of said mobile cart with respect to said container a plurality of times after a first measurement of said thickness of said lining material inside said container and after each time that said position is changed,
    determining said position of said mobile cart with respect to said inertial frame of reference by emitting optical radiation from said first optical radiation source in said tracking system to said at least three reflectors and receiving reflected optical radiation from said at least three reflectors to said tracking system,
    making a plurality of range measurements from said mobile cart to said plurality of points located at said lining material inside said container by emitting optical radiation from said second optical radiation source in said contouring system to said inside of said container and receiving reflected optical radiation from said inside of said container to said contouring system, and
    mathematically combining said plurality of range measurements with at least one of said inertial frame of reference, said known coordinate system, said position of said mobile cart, and said position of said contouring system with respect to said mobile cart in order to determine said thickness of lining material in said container.

2. The method of claim 1, wherein said providing a container further comprises providing a pivotally mounted container.

3. The method of claim 2, wherein said providing said tracking system and said contouring system further comprise providing a mobile cart having at least said tracking system and said contouring system mounted thereon.

4. The method of claim 2, further comprising:
measuring an angular position of said pivotally mounted container in said known coordinate system; and
mathematically combining said plurality of range measurements with at least said angular position in order to measure said thickness of said lining material in said container.

5. The method of claim 4, further comprising broadcasting said angular position to a computer configured to perform said mathematically combining using a radio link between said pivotally mounted container and said computer.

6. The method of claim 1, further comprising:
providing a container configured to move in at least one translational direction and to tilt in at least one angular direction;
measuring a translation position and a tilting position of said container in said known coordinate system; and
mathematically combining said plurality of range measurements with at least said translation position and said tilting position of said container in order to measure said thickness of said lining material in said container.

7. The method of claim 1, wherein said at least three reflectors are selected from the group consisting of strip reflectors, round reflectors, and active reflectors.

8. The method of claim 1, wherein said determining said position of said tracking system further comprises determining said position of said tracking system with respect to said inertial frame of reference by emitting optical radiation from a first substantially collimated optical radiation source.

9. The method of claim 8, wherein said making a plurality of range measurements further comprises making a plurality of range measurements with said contouring system to a plurality of points located at the surface of said lining inside said container by emitting optical radiation from a second substantially collimated optical radiation source.

10. The method of claim 1, further comprising performing said method remotely.

11. The method of claim 1, further comprising automatically performing said method without operator assistance.

12. The method of claim 1, further comprising,
after said selecting an inertial frame of reference,
measuring angular variations in said position of said mobile cart in said working environment, and
mathematically combining said plurality of range measurements with at least said angular variations in the position of said mobile cart in order to determine said thickness of said lining material in said container.

13. A method for measuring the thickness of lining material inside a container comprising:
providing a container having an opening and a known coordinate system with respect to a working environment thereof, said container being configured to move in at least one translational direction and to tilt in at least one annular direction;
measuring a translation position and a tilting position of said container in said known coordinate system;
selecting an inertial frame of reference in said working environment;
providing at least three reflectors mounted to stationary structures in said working environment, wherein the position of each one of said at least three reflectors with respect to said inertial frame of reference is known, wherein said selecting an inertial frame of reference comprises selecting an inertial frame of reference at the position of one of said at least three reflectors;
providing a tracking system;
providing a contouring system, wherein the position of said contouring system with respect to said tracking system is known;
providing a mobile cart having said tracking system and said contouring system mounted thereon;
determining a position of said tracking system with respect to said inertial frame of reference by emitting optical radiation from a first optical radiation source in said tracking system to said at least three reflectors and receiving reflected optical radiation from said at least three reflectors to said tracking system, said first optical radiation source being substantially collimated;
making a plurality of range measurements with said contouring system to a plurality of points located at the surface of said lining material inside said container by emitting optical radiation from a second optical radiation source in said contouring system to the inside of said container and receiving reflected optical radiation from the inside of said container to said contouring system, said making a plurality of range measurements comprises making said plurality of range measurements with said contouring system to said plurality of points located at said surface of said lining material inside said container by emitting optical radiation from a second optical radiation source, which is substantially collimated;
mathematically combining said plurality of range measurements with at least one of: said inertial frame of reference, said known coordinate system, said position of said tracking system, said position of each one of said at least three reflectors, said translation position, said tilting position of said container and said position of said contouring system with respect to said tracking system in order to determine said thickness of lining material in said container changing a position of said mobile cart with respect to said container a plurality of times after a first measurement of said thickness of said lining material inside said container and after each time that said position is changed;
determining said position of said mobile cart with respect to said inertial frame of reference by emitting optical radiation from said first optical radiation source in said tracking system to said at least three reflectors and receiving reflected optical radiation from said at least three reflectors to said tracking system;
making a second plurality of range measurements from said mobile cart to a second plurality of points located at said lining material inside said container by emitting optical radiation from said second optical radiation source in said contouring system to said inside of said container and receiving reflected optical radiation from said inside of said container to said contouring system; and
mathematically combining said second plurality of range measurements with at least one of said inertial frame of reference, said known coordinate system, said positions of said mobile cart, and said position of said contouring system with respect to said mobile cart in order to determine said thickness of lining material in said container.

14. The method of claim 13, further comprising, measuring angular variations in the position of said mobile cart in said working environment, and mathematically combining said plurality of range measurements with at least said angular variations in said position of said mobile cart in order to determine said thickness of lining material inside said container.

15. The method of claim 13, wherein said providing a container further comprises providing a pivotally mounted container.

16. The method of claim 15, further comprising:

measuring an angular position of said pivotally mounted container in said known coordinate system; and mathematically combining said plurality of range measurements with at least said angular position in order to measure said thickness of said lining material in said container.

17. The method of claim 16, further comprising broadcasting said angular position to a computer configured to perform said mathematically combining using a radio link between said pivotally mounted container and said computer.

18. The method of claim 13, wherein said at least three reflectors are selected from the group consisting of strip reflectors, round reflectors, and active reflectors.

19. The method of claim 13, further comprising performing said method remotely.

20. The method of claim 13, further comprising automatically performing said method without operator assistance.

* * * * *